United States Patent
Liu et al.

(10) Patent No.: US 7,947,410 B2
(45) Date of Patent: May 24, 2011

(54) FUEL CELL ELECTRODES WITH TRIAZOLE MODIFIED POLYMERS AND MEMBRANE ELECTRODE ASSEMBLIES INCORPORATING SAME

(75) Inventors: Meilin Liu, Alpharetta, GA (US); Xiaobing Zhu, Atlanta, GA (US); Min Kyu Song, Atlanta, GA (US); John G. Muldoon, Saline, MI (US); Kohei Hase, Aichi (JP)

(73) Assignees: Toyota Motor Engineering & Manufacturing North America, Inc., Erlanger, KY (US); Toyota Motor Corporation, Aichi Prefecture (JP); Georgia Tech Research Corporation, Atlanta, GA (US)

( * ) Notice: Subject to any disclaimer, the term of this patent is extended or adjusted under 35 U.S.C. 154(b) by 118 days.

(21) Appl. No.: 12/196,452

(22) Filed: Aug. 22, 2008

(65) Prior Publication Data
US 2010/0323273 A1    Dec. 23, 2010

(51) Int. Cl.
| | |
|---|---|
| H01M 4/02 | (2006.01) |
| H01M 8/00 | (2006.01) |
| H01M 4/92 | (2006.01) |
| B01J 23/40 | (2006.01) |
| B01J 21/18 | (2006.01) |

(52) U.S. Cl. ........ 429/530; 429/487; 429/524; 429/535; 502/185

(58) Field of Classification Search .............. 429/12–46, 429/400–535; 502/185
See application file for complete search history.

(56) References Cited

U.S. PATENT DOCUMENTS

| | | | |
|---|---|---|---|
| 5,084,144 A | 1/1992 | Reddy et al. | |
| 5,234,777 A | 8/1993 | Wilson | |
| 6,103,077 A | 8/2000 | DeMarinis et al. | |
| 6,228,187 B1 | 5/2001 | Till | |
| 6,300,000 B1 | 10/2001 | Cavalca et al. | |
| 6,344,428 B1 | 2/2002 | Lim et al. | |
| 6,977,234 B2 | 12/2005 | Kosako et al. | |
| 6,987,163 B2 | 1/2006 | Cabasso et al. | |
| 7,005,206 B2 | 2/2006 | Lawrence et al. | |
| 7,008,971 B2 | 3/2006 | Taft, III et al. | |
| 7,201,982 B2 | 4/2007 | Maes et al. | |
| 2001/0018145 A1 | 8/2001 | Datz et al. | |
| 2002/0004159 A1* | 1/2002 | Totsuka | 429/41 |
| 2004/0146766 A1 | 7/2004 | Li et al. | |

(Continued)

FOREIGN PATENT DOCUMENTS

| | | |
|---|---|---|
| JP | 2005248114 | 9/2005 |
| WO | WO2004107477 A2 | 12/2004 |
| WO | WO2005001037 A2 | 1/2005 |
| WO | WO2005274240 A2 | 3/2005 |
| WO | WO2005072413 A2 | 8/2005 |
| WO | WO2005114772 A2 | 12/2005 |

OTHER PUBLICATIONS

Li et al., 1H-1,2,4-Triazole: An Effective Solvent for Proton-Conducting Electrolytes, Nov. 2005, Chem. Mater., vol. 17, pp. 5884-5886.* Megan McRainey, Institute Communications & Public Affairs—"Chemical could revolutionize polymer fuel cells", Georgia Institute of Technology, http//www.gatech.edu/news-room/release.php?id=618.

*Primary Examiner* — Basia Ridley
*Assistant Examiner* — Jonathan G Leong
(74) *Attorney, Agent, or Firm* — Dinsmore & Shohl LLP (57) ABSTRACT

Embodiments of the present inventions are directed to fuel cell electrodes in membrane electrode assemblies, and methods of making same wherein the fuel cell electrodes comprise a catalyst layer and a gas diffusion layer. The catalyst layer comprises at least one catalyst, phosphoric acid and a binder comprising at least one triazole modified polymer.

11 Claims, 9 Drawing Sheets

U.S. PATENT DOCUMENTS

| | | |
|---|---|---|
| 2005/0053821 A1 | 3/2005 | Jang |
| 2005/0113547 A1 | 5/2005 | Li et al. |
| 2006/0111530 A1* | 5/2006 | Li et al. .................... 526/258 |
| 2006/0177717 A1 | 8/2006 | Teasley et al. |
| 2006/0263662 A1 | 11/2006 | Lee et al. |
| 2007/0015022 A1 | 1/2007 | Chang et al. |
| 2007/0134535 A1 | 6/2007 | Song et al. |
| 2007/0160889 A1 | 7/2007 | Korin et al. |
| 2007/0166601 A1* | 7/2007 | Sano et al. ................ 429/43 |
| 2007/0196713 A1 | 8/2007 | Mah et al. |

* cited by examiner

FUEL CELL ELECTRODES WITH TRIAZOLE MODIFIED POLYMERS AND MEMBRANE ELECTRODE ASSEMBLIES INCORPORATING SAME

TECHNICAL FIELD

Embodiments of the present invention are generally directed to electrodes for membrane electrode assemblies in proton electrolyte membrane fuel cells (PEMFC), and are specifically directed to electrodes having catalyst layers comprising triazole modified polymers and phosphoric acid which facilitates operability at higher temperatures (e.g., 120° C. and higher).

BACKGROUND

In an effort to find new energy sources, fuel cells using an electrochemical reaction to generate electricity are becoming an attractive energy alternative. Fuel cells offer low emissions, high fuel energy, high conversion efficiencies, and low levels of noise and vibration. Proton electrolyte membrane fuel cells (PEMFCs) have been identified in many industries, such as the automotive industry, as an especially advantageous fuel cell design, and therefore, the development of new and improved materials and components inside the PEMFC is ongoing.

In particular, high temperature PEMFCs operational above 120° C. with low humidification or without humidification, can offer several advantages such as anode tolerance to significant quantities of carbon monoxide poisoning, operability without humidification, electrode kinetics enhanced by high temperatures (e.g. 120° C.), elimination of cathode flooding, and ease of thermal management. While conventional electrodes for PEMFCs are mainly focused on Nafion®-based electrodes (e.g., commercial E-TEK® electrodes), Nafion®-based electrodes are only operable for low temperature PEMFCs (e.g., operational below 100° C.), and are reliant on external or internal (e.g., self-humidifying) humidity for proton transfer.

Due to the issues with Nafion®-based electrodes, alternative polymers which facilitate operation at high temperature without humidity have been studied. For example, a blend of polybenzimidazole (PBI) and phosphoric acid has been identified as a feasible composition for operation at high temperatures. The blend of PBI and phosphoric acid performs the function that water provides in Nafion®-based electrodes (i.e., proton transfer), thus humidification is not necessary. However, to achieve acceptable proton transfer and conductivity, the PBI/phosphoric acid blend requires substantial amounts of phosphoric acid (e.g., 3.5 to 7.5 $H_3PO_4$ per PBI repeating unit), which results in acid leeching and corrosion of the membrane electrode assembly. As a result, improved compositions for catalyst layers of fuel cell electrodes that maximize proton transfer and conductivity while minimizing corrosion is highly desirable.

SUMMARY

Embodiments of the present invention are directed to catalyst layers of fuel cell electrodes that are operable at high temperatures without humidification, and membrane electrode assemblies which incorporate these fuel cell electrodes. According to one embodiment, a fuel cell electrode is provided. The fuel cell electrode comprises a catalyst layer and a gas diffusion layer. The catalyst layer comprises at least one catalyst, phosphoric acid, and a binder comprising at least one triazole modified polymer.

According to another embodiment, a method of forming a catalyst layer is provided. The method comprises providing a triazole modified polymer, mixing the triazole modified polymer with a catalyst, and adding phosphoric acid to the mixture of triazole modified polymer and catalyst to form a catalyst ink which is formed into the catalyst layer of the membrane electrode assembly.

According to yet another embodiment, a catalyst layer comprising a cellular microstructure is provided. The catalyst layer comprises a plurality of catalysts comprising a carbon based support, phosphoric acid, and a binder comprising organosiloxane crosslinker adsorbed onto the plurality of catalysts. The adsorption is produced by the phosphoric acid catalyzed linking of organosiloxane crosslinker in the binder with the carbon based support of the plurality of catalysts. The adsorption of the binder onto the plurality of catalysts produces a catalyst layer having a cellular microstructure.

These and additional features provided by the embodiments of the present invention will be more fully understood in view of the following detailed description, in conjunction with the drawings.

BRIEF DESCRIPTION OF THE DRAWINGS

The following detailed description of specific embodiments of the present invention can be better understood when read in conjunction with the drawings enclosed herewith.

The embodiments set forth in the drawings are illustrative in nature and not intended to be limiting of the invention defined by the claims. Moreover, individual features of the drawings and invention will be more fully apparent and understood in view of the detailed description.

DETAILED DESCRIPTION

Embodiments of the present invention are generally directed to membrane electrode assemblies in proton electrolyte membrane fuel cells (PEMFC), and are specifically directed to membrane electrode assemblies comprising catalyst layers with triazole modified polymeric binders which facilitate operability at higher temperatures (e.g., 120° C. and higher).

Figure 1:
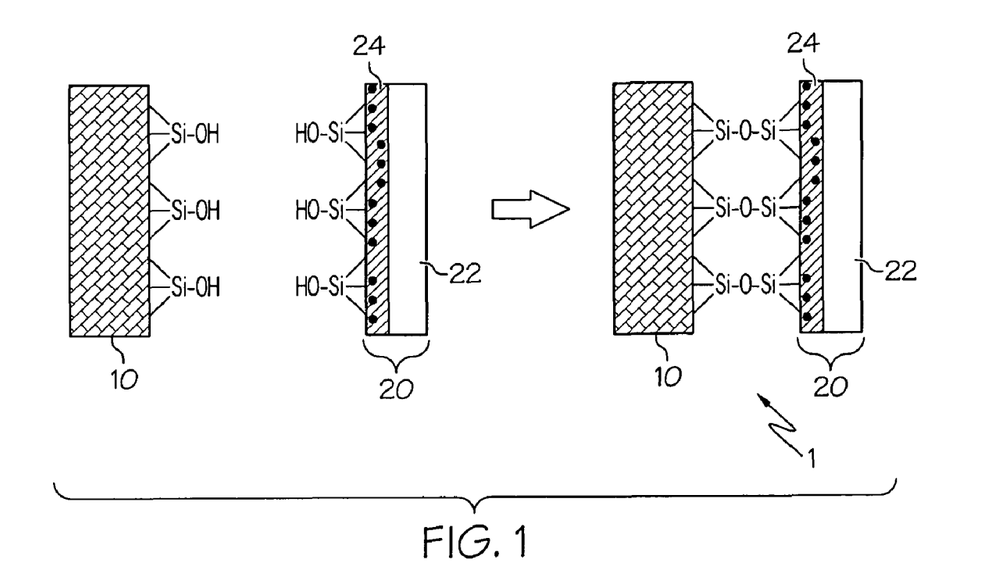
FIG. 1 is a schematic view of the components of a membrane electrode assembly according to one or more embodiments of the present invention.
Figure 4A:
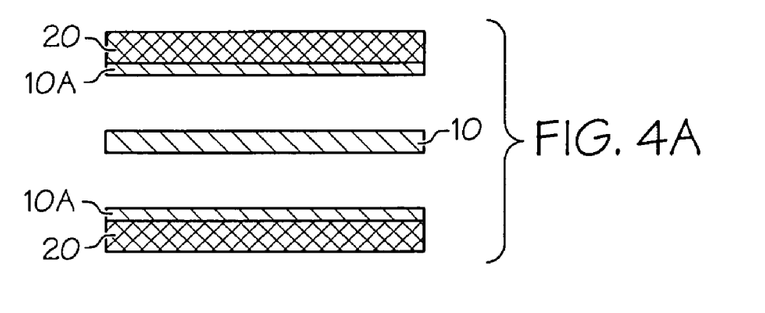
FIGS. 4A-4C are schematic views illustrating a method of producing a membrane electrode assembly according to one or more embodiments of the present invention.
Figure 4B:
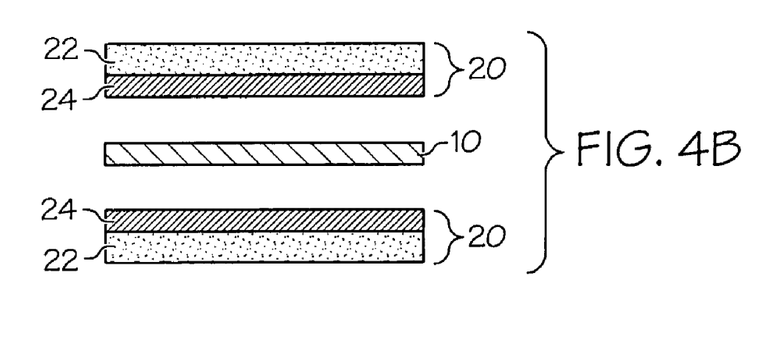
Figure 4C:
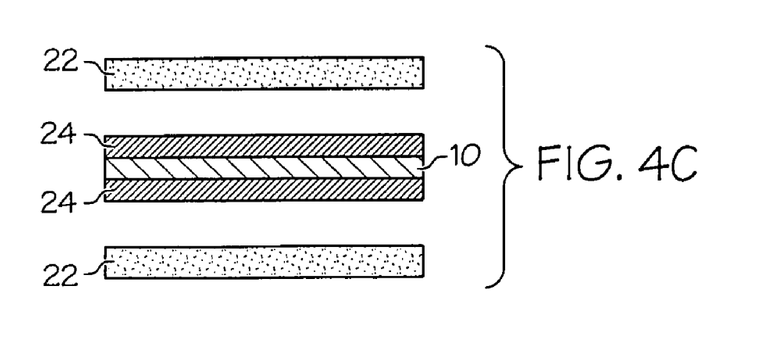

Referring to FIGS. 1 and 4B, a membrane electrode assembly 1 may comprise an electrolyte membrane 10, and a pair of fuel cell electrodes 20 (e.g., gas diffusion electrodes) disposed on opposite sides of the electrolyte membrane 10. As would be familiar to one of ordinary skill in the art, the pair of electrodes 20 is the anode and cathode of the membrane electrode assembly 1. Each electrode 20 (e.g., anode or cathode) comprises a catalyst layer 24 and a gas diffusion layer 22. As shown in FIGS. 4B and 4C, the catalyst layer 24 of each electrode 20 is coupled to opposite surfaces of the electrolyte membrane 10. Referring to FIG. 4A, it is also contemplated that an electrolyte primer layer 10A, which may comprise the same composition as the electrolyte membrane 10, may be applied to the electrode to improve adhesion between the electrode 20 and the electrolyte membrane 10.

The catalyst layer 24 may comprise at least one catalyst, phosphoric acid, and a binder. The catalyst may comprise many suitable compositions, for example, platinum, platinum alloys, carbon, or electrically conductive materials and combinations thereof. In one embodiment, the catalyst may comprise a mixture of platinum and carbon, for example, 20 to 60 wt % Pt on a carbon support. In some embodiments, the Pt may comprise a loading amount ranging from about 0.2 to about 4 mg/cm². The Pt catalyst can be one that is commercially available, such as E-TEK® brand Pt manufactured by BASF Fuel Cell, and the C support may be carbon black VULCAN® XC72 produced by Cabot Corp. Additional catalyst compositions (e.g., rhodium or palladium) are also contemplated herein.

Figure 2:
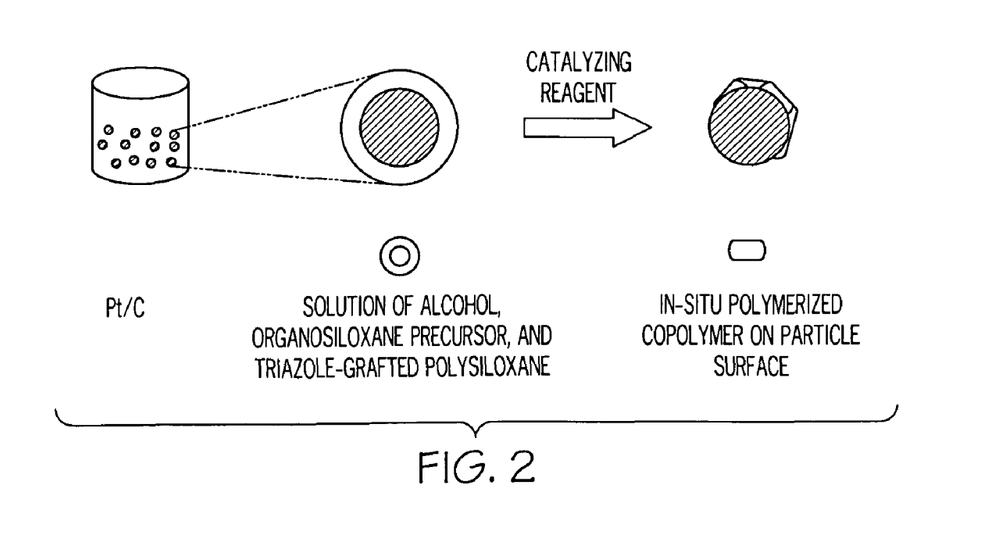
FIG. 2 is a schematic view illustrating the reaction mechanism for the catalyst layer of the fuel cell electrode according to one or more embodiments of the present invention.

In addition, the catalyst layer may also comprise phosphoric acid. The phosphoric acid may act to increase the proton transfer and conductivity inside the catalyst layer (similar to the binder discussed below). In one embodiment, the phosphoric acid may be added as a catalyzing reagent during the formation of the catalyst layer as shown in FIG. 2. Alternatively, the phosphoric acid may be added as a dopant after the catalyst layer has been formed. In exemplary embodiments, the phosphoric acid may be loaded in an amount ranging from about 5 to about 100 mg/cm², from about 10 mg/cm² to about 20 mg/cm², or in another suitable amount familiar to one of ordinary skill in the art. As will be described in greater detail below, adding phosphoric acid as a catalyzing reagent improves the morphology and the final properties of the catalyst layer. However, it should be understood that although this description focuses on the use of phosphoric acid, other acids or acid/base combinations are also contemplated herein for use as a catalyzing reagent.

In one embodiment, the binder may comprise at least one triazole modified polymer which is configured to ensure that the catalyst contacts the surface of the electrolyte membrane. As used herein, "triazole modified polymer" means that a polymer composition has a triazole substituted or grafted onto the polymer. The triazole modified polymer may comprise various compositions (e.g., polysiloxane). Polysiloxane is believed to be especially advantageous because it has a flexible structure, which provides various benefits for the catalyst layer, such as oxygen permeability. Examples of suitable triazole modified polysiloxanes include 1,2,3-triazole and 1,2,4-triazole, such as shown below.

Both 1,2,3-triazole and 1,2,4-triazole promote proton conduction via intermolecular proton transfer between the triazole groups (Grotthuss mechanism), and display adequate electrochemical stability under fuel cell operating conditions. Because triazole conducts protons, the catalyst layer does not need humidification (e.g., the catalyst layer is anhydrous), and is thus effective at temperatures above the boiling point of water.

Useful binders may further comprise TEOS (tetraethyl orthosilicate) or other organosiloxane crosslinkers. Furthermore, the catalyst layer may also utilize PVDF (polyvinylidifluoride) to provide additional binding. In some embodiments, the PVDF may be excluded from the binder, because the other components of the binder (e.g., the triazole modified polymer and the organosiloxane crosslinker) may perform the function of the PVDF (i.e., binding the catalyst layer 24 to the electrolyte membrane 10) (see e.g., FIG. 5C). Additionally, the binder may comprise solvents (e.g., organic solvents such as methanol, ethanol, propanol, acetone, or combinations thereof).

A catalyst layer utilizing triazole modified polymers (e.g., triazole grafted polysiloxane) and phosphoric acid demonstrates improved properties over other anhydrous high temperature membrane electrode assemblies (e.g., PBI based anhydrous high temperature membrane electrode assemblies). For example, PBI is a thermoplastic polymer with a rigid backbone and a higher glass transition temperature than triazole. As a result of this rigid backbone, PBI electrode assemblies achieve poor proton transfer. Because of its higher glass transition temperature, PBI electrode assemblies demonstrate poor oxygen permeability. PBI electrode assemblies compensate for the poor proton transfer by providing a high concentration of phosphoric acid (e.g. 3.5 to 7.5 $H_3PO_4$ moles per PBI repeating unit). In contrast to PBI electrode assemblies, the triazole utilized in the embodiments discussed herein is a stronger acid with a lower pKa value than benzimidazole of the PBI composition, thus triazole is more effective at proton conduction via intermolecular proton transfer between the triazole groups (Grotthuss mechanism). Benzimidazole has a pKa value of about 5.6, whereas 1,2,3-triazole and 1,2,4-triazole have lower pKa values of about 1.2 and 2.19, respectively. Due to these lower pKa values, triazole is significantly better than imidazole at proton transfer; therefore, the present catalyst layer requires less phosphoric acid to achieve the requisite conductivity (3.0 $H_3PO_4$ moles per moles of triazole). With a lower concentration of phosphoric acid, the triazole modified polymer reduces acid leeching and corrosion inside the membrane electrode assembly. Moreover, unlike PBI electrode assemblies, a triazole modified polysiloxane is a polymer having a flexible triazole arm and a flexible polysiloxane backbone. Because triazole modified polysiloxanes are not thermoplastic polymers, they have a lower glass transition temperature than PBI. Due to the flexible backbone as well as a lower glass transition temperature, the triazole modified polysiloxane provides improved oxygen permeability, which also benefits the functionality of the catalyst layer.

Referring again to the membrane electrode assembly 1 of FIG. 1, the gas diffusion layer 22 of the fuel cell electrode 20 can be a microporous layer comprising carbon cloth, carbon paper, and combinations thereof. Like the catalyst layer 24, the electrolyte membrane 10 may comprise triazole modified polysiloxane, and phosphoric acid in order to provide operability at high temperatures and no humidity. The electrolyte membrane 10 may also comprise ePTFE, organosiloxane crosslinkers such as TEOS, or combinations thereof. Due to the polysiloxane and organosiloxane precursor materials present in the catalyst layer 24 and the electrolyte membrane 10, the interface between electrode and membrane may be very strongly bonded through the Si—O chemical bonds.

Referring to the embodiment of FIG. 2, a process for producing the catalyst layer (i.e., in situ polymerization from sols) is provided. As shown, the process may comprise providing a binder solution (e.g., binder polymer sol) comprising a triazole modified polymer dissolved in an organic solvent (e.g., an alcohol solvent). In one embodiment, the binder solution may comprise an organosiloxane crosslinker and triazole grafted polysiloxane in a methanol/alcohol solvent, with or without PVDF in polar organic solvent. Meanwhile, the phosphoric acid may be added into the binder solution as a catalyzing reagent as shown in FIG. 2, or may be doped into the catalyst layer after the catalyst layer is formed via in-situ polymerization.

Figure 7A:
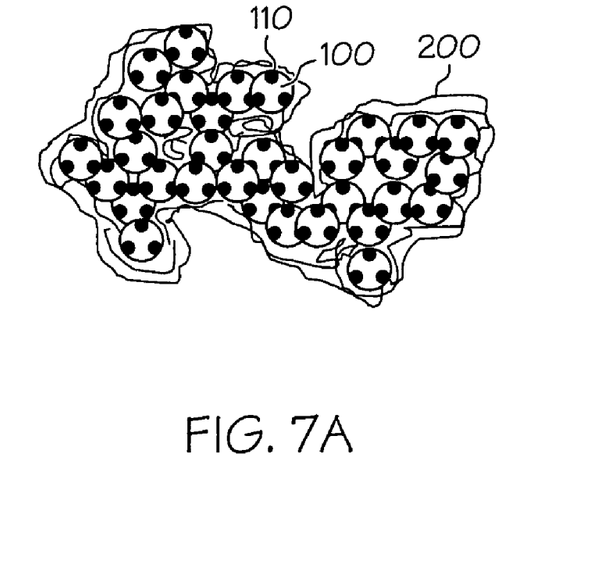
FIG. 7A is a schematic view illustrating the microstructure of a catalyst layer produced by adding phosphoric acid as a dopant after the formation of the catalyst layer according to one or more embodiments of the present invention.
Figure 8A:
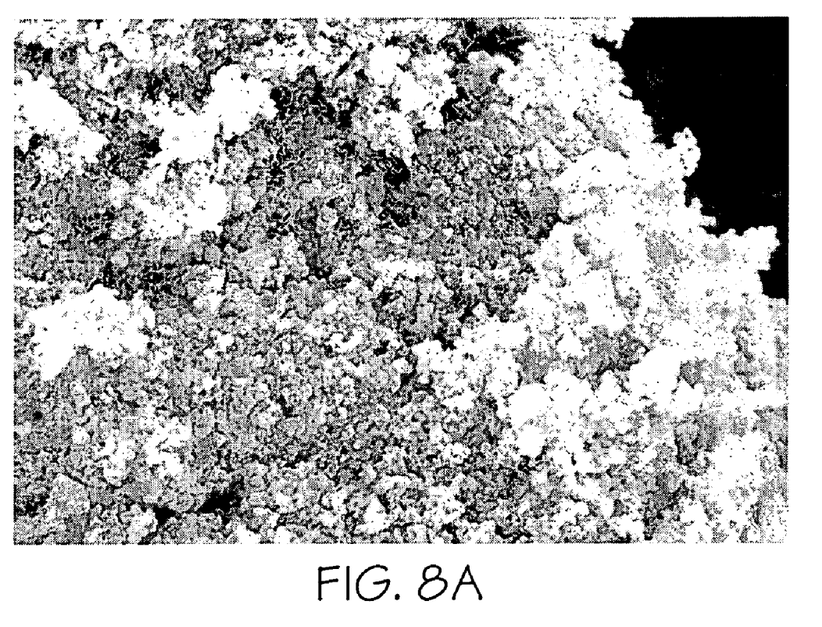
FIGS. 8A and 8B are scanning electron micrograph (SEM) images with 2 µm and 200 nm magnification, respectively, of the microstructure of a catalyst layer produced by adding phosphoric acid as a dopant after the formation of the catalyst layer according to one or more embodiments of the present invention.
Figure 8B:
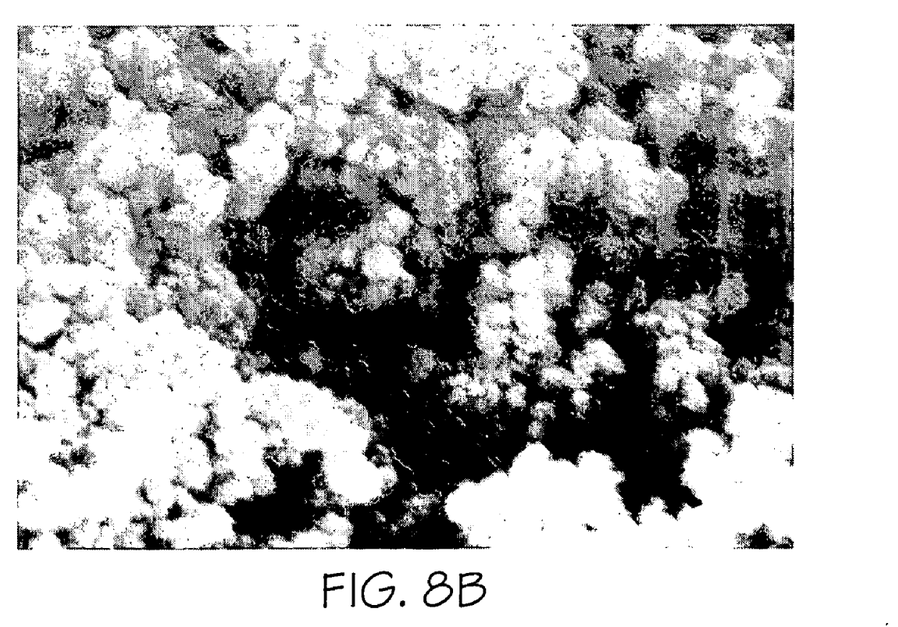

In addition, the microstructure and performance of the catalyst layer can be impacted by the ordering of the processing steps. For example, when the catalyst layer is formed before adding phosphoric acid (i.e., phosphoric acid is used as a dopant), the sol-gel reactions (i.e., hydrolysis, condensation, and polycondensation) of organosiloxane crosslinker and triazole modified polymer inside the binder is impeded at least partially because the colloidal particles and condensed silica species can not easily link together. Because the sol-gel reactions are partially impeded, the microstructure of the catalyst layer, as shown in FIG. 7A, demonstrates a layer-shape, wherein the binder 200 is primarily surrounding the Pt catalyst 110 on the C support 100. The layer structure is further illustrated in the SEM images of FIGS. 8A and 8B.

Figure 7B:
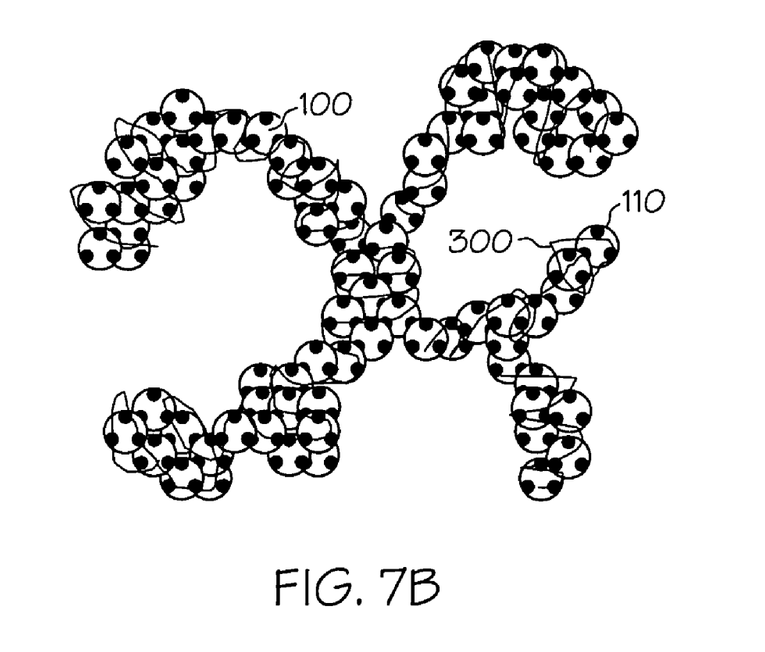
FIG. 7B is a schematic view illustrating the microstructure of a catalyst layer produced by adding phosphoric acid as a catalyst reagent during the formation of the catalyst layer according to one or more embodiments of the present invention.
Figure 9A:
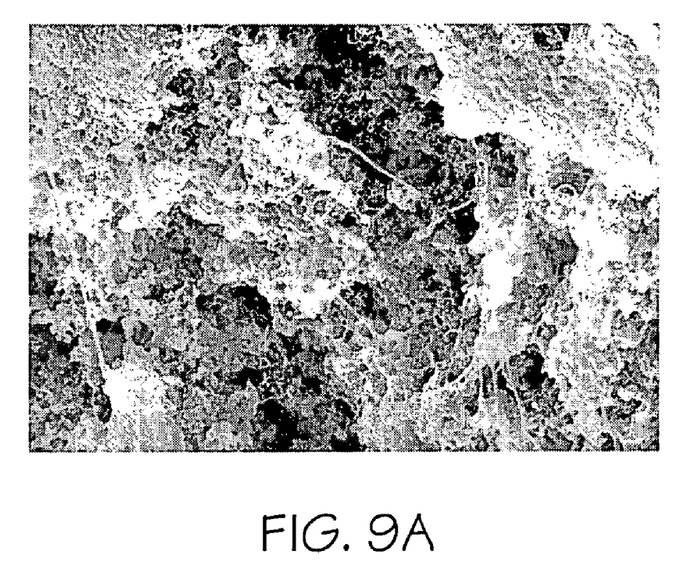
FIGS. 9A and 9B are scanning electron micrograph (SEM) images with 2 µm and 200 nm magnification, respectively, of the microstructure of a catalyst layer produced by adding phosphoric acid as a catalyst reagent during the formation of the catalyst layer according to one or more embodiments of the present invention.
Figure 9B:
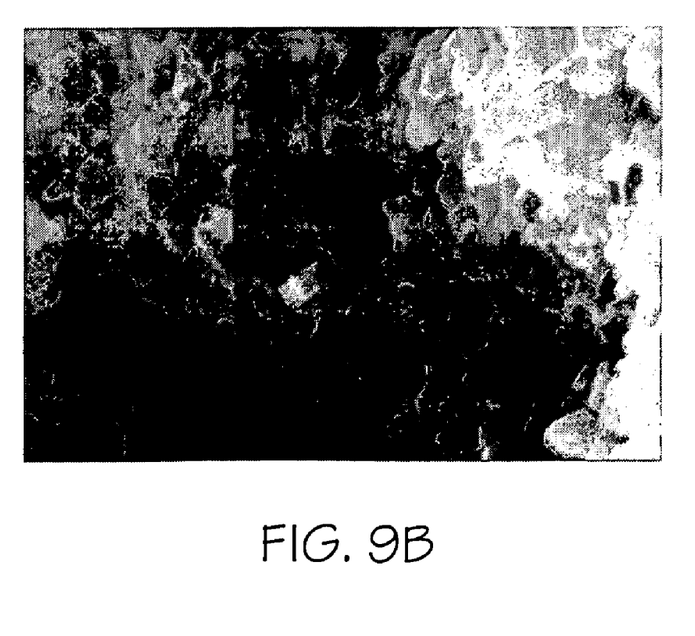

In contrast, when phosphoric acid is added as a catalyzing reagent during catalyst layer formation as shown in FIG. 2, the phosphoric acid catalyst helps link the colloidal particles and condensed silica species, thereby aiding the hydrolysis, condensation and polycondensation reactions. As a result, the binder 300 is interspersed into the catalysts (e.g., Pt on a C support), thus the microstructure of the catalyst layer defines a cellular-shape microstructure as shown in FIG. 7B. Because of the addition of catalyzing reagent, the binder is adsorbed onto the catalyst particle surface (e.g., Pt/C). The condensation, polycondensation and gelation reactions are aided by the phosphoric acid catalyzing regent, thus forming cohesion forces between the colloidal organosilicon compound binder and the carbon agglomerates to form a cellular-shape microstructure as shown in FIG. 7B. This cellular microstructure is further illustrated in the SEM images of FIGS. 9A and 9B. The microstructure of FIG. 7B has an advantage over the microstructure of FIG. 7A, in that it provides better mass transportation, higher catalyst utilization, and thus higher performance.

Figure 3A:
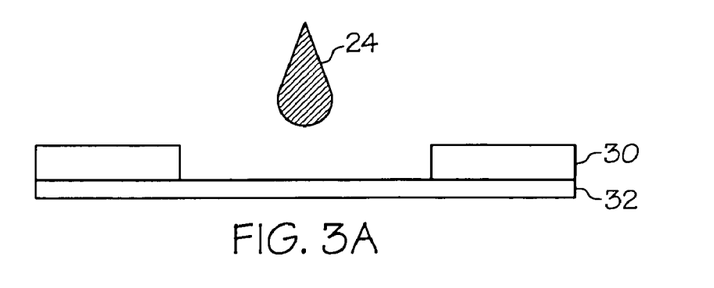
FIGS. 3A-3E are schematic views illustrating a method of producing a fuel cell electrode according to one or more embodiments of the present invention.

From the foregoing, it should be understood that fuel cell electrodes 20 can be formed from the catalyst layers 24 and gas diffusion layers 22. Formation of fuel cell electrodes 20 may be achieved by the application of the catalyst layer or ink 24 onto a gas diffusion layer 22. As described above, the catalyst ink 24 comprises at least one catalyst, phosphoric acid, and a binder comprising at least one triazole modified polymer. Further as stated above, the microporous gas diffusion layer 22 comprises carbon paper or carbon cloth. To form fuel cell electrodes 20, the catalyst ink 24 is applied onto at least one surface of the gas diffusion layer 22 such as shown in FIGS. 3A and 3E. The ink may be applied via casting, brushing, spraying, or combinations thereof. When applying the ink, it may be desirable to first heat the gas diffusion layer 22 to a temperature of about 25° C. to about 100° C. by using a heating element such as a hot plate. After the ink is applied, the electrode 20 may be dried (e.g., for several hours at a temperature ranging from about 60° C. to about 130° C.).

Figure 3B:
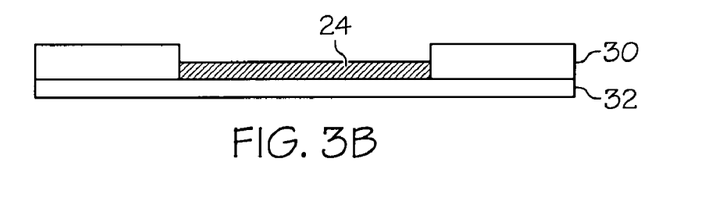
Figure 3C:
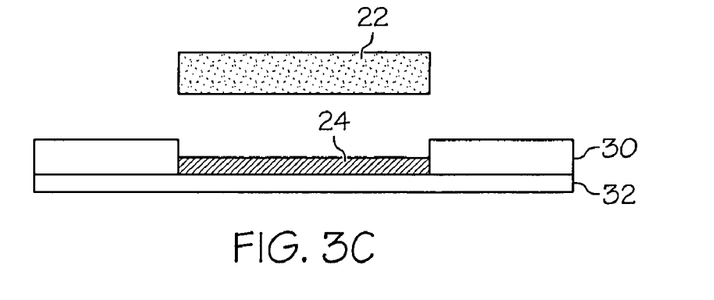
Figure 3D:
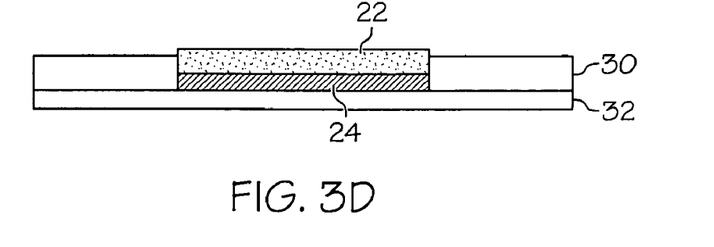
Figure 3E:
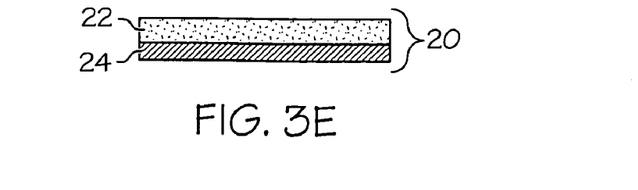

Further as shown in FIGS. 3A-3E, the fuel cell electrodes 20 may alternatively be produced by using a mold 30. In this embodiment, the ink 24 is applied via casting on a thick polytetrafluoroethylene sheet 32 and inside a mold 30 disposed on the polytetrafluoroethylene sheet. The ink 24 may form a layer on the polytetrafluoroethylene sheet as shown in FIG. 3B. After casting onto the sheet, it may be desirable to evaporate a portion of solvent in the ink 24. Referring to FIGS. 3C and 3D, the gas diffusion layer 22 can be laid on the top surface of the ink 24, and subsequently dried in air for a period of up to 12 to 24 hours. After drying, the polytetrafluoroethylene sheet 32 and the mold 30 can be removed to produce the electrode 20 as shown in FIG. 3E.

Upon formation of the electrodes 20, formation of the membrane electrode assembly 1 includes binding the electrode 20 to the electrolyte membrane 10. In the embodiment of FIG. 4A, an electrolyte primer layer 10A having the same composition as the electrolyte membrane 10 may be coated on a surface of fuel cell electrode 20, then the electrolyte layer 10A can be hot-pressed to the electrolyte membrane 10. Alternatively as shown in FIG. 4B, the membrane electrode assembly 1 may be formed without the addition of the interposed electrolyte layer 10A shown in FIG. 4A. As shown in FIG. 4B, the catalyst layer 24 can be directly hot pressed to the electrolyte membrane 10. Although various processing conditions are suitable, the fuel cell electrode 20 may, in one exemplary embodiment, be hot pressed onto the electrolyte membrane 10 at a temperature of about 200° C.

Figure 5A:
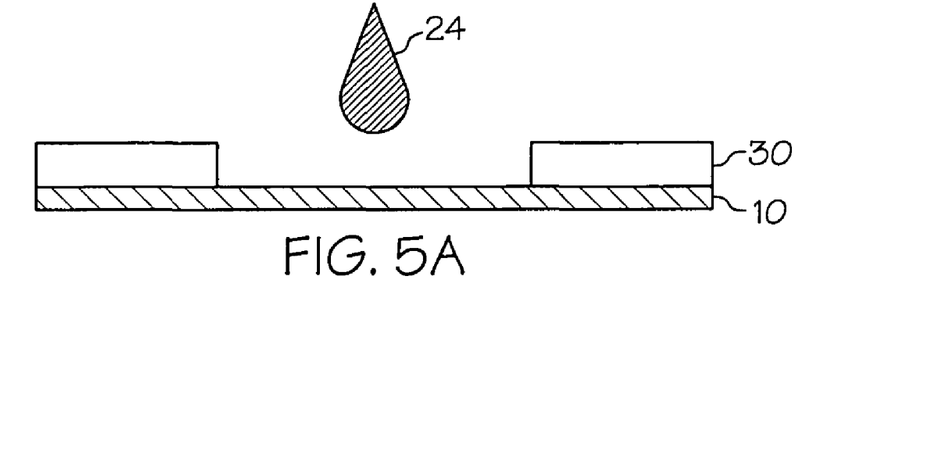
FIGS. 5A-5C are schematic views illustrating a method of applying a catalyst ink to a surface of a membrane according to one or more embodiments of the present invention.
Figure 5B:
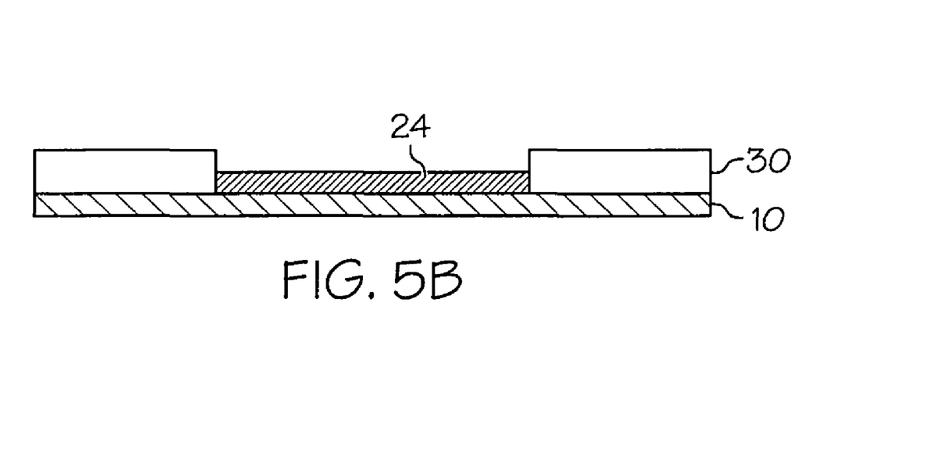
Figure 5C:
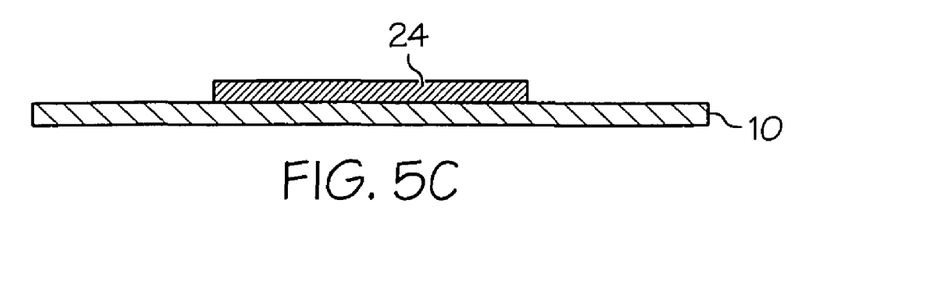

Referring to an alternative embodiment illustrated in FIG. 4C, the catalyst layer 24 may be coated on both sides of an electrolyte membrane 10, without the prior step of bonding the catalyst layer 24 to a gas diffusion layer 22 to form an electrode 20. The coating may occur through spraying, transfer printing, or casting. Referring to FIGS. 5A through 5C, a casting process may utilize a mold 30 applied onto the electrolyte membrane 20. The catalyst layer 24 may be applied as an ink 24 inside the mold 30 onto one or more surfaces of the electrolyte membrane 10. After the ink forms a layer as shown in FIG. 5B, the mold 30 is removed as shown in FIG. 5C.

The aforementioned embodiments of the present invention may be additionally illustrated in view of the Examples provided below:

Example 1

Preparation of Fuel Cell Electrodes 0.01 g of 1,2,4-triazole-grafted polysiloxane, and TEOS and Si—C8 crosslinker (1:1 weight ratio) were dissolved in 5 ml methanol/ethanol (1:1 weight ratio). The binder loading in the electrode was maintained at about 0.125 mg/cm². Meanwhile, a 5% PVDF in NMP solvent solution was also produced. Then 0.2 g Pt/C (60% Pt, E-TEK on XC-72 carbon) catalyst was provided at a loading rate of 1-1.5 mg/cm², and was then mixed with the above-mentioned PVDF, polysiloxane and crosslinker solutions. Then, the mixed components were stirred for 2 hours, and distributed in the ultrasonic bath for 30 minutes. Thus, the catalyst ink was prepared. 5 g of the catalyst ink was then directly cast on the gas diffusion layer (E-TEK, 100 cm²). Afterward, the ink was dried carefully in air at room temperature overnight, and then heat-treated at 60° C. for 4 hours, and 130° C. for 30 minutes. After the catalyst layer was formed, the phosphoric acid in water solution was doped on the surface electrode with acid loading of 10 mg/cm². The fuel cell electrode was thus prepared.

Example 2

Preparation of Membrane Electrode Assembly

The fuel cell electrode from Example 1 was hot-pressed to a membrane comprising the following components: ePTFE, 1,2,4-triazole-grafted polysiloxane, TEOS and Si—C8 crosslinker) at 200° C., 4 psi for 5 minutes. The MEA was prepared.

Example 3

Comparison with Nafion®-Based Electrodes

Figure 6:
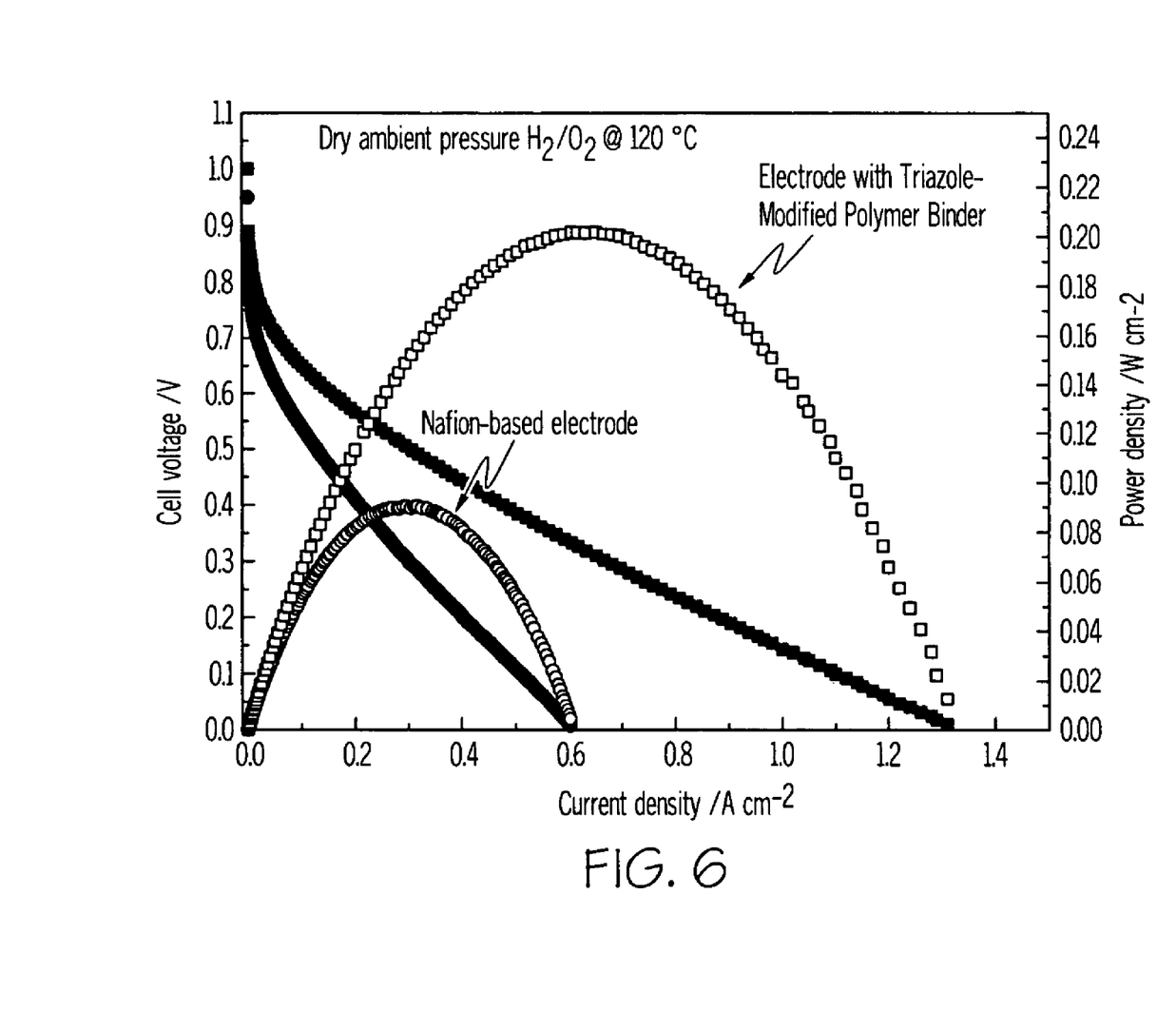
FIG. 6 is a graphical illustration comparing the MEA performance of Nafion®-based electrodes to an electrode including a catalyst layer with a triazole modified polymer according to one or more embodiments of the present invention.

Referring to FIG. 6, the performance of electrodes produced by Example 1 is compared with modified Nafion®-based electrodes. The modified Nafion®-based electrode included Pt loading of 0.5 mg/cm², and was modified with a phosphoric acid dopant (acid loading of 20 mg/cm² via PA acid in water solution), followed by drying at 110° C. for half an hour. In comparing the fuel cells with Nafion®-based electrode with fuel cells having the electrode of Example 1, the conditions were as follows: The single cell torque was 4N·m. The single fuel cell was operated at 120° C., at ambient pressure of $H_2$ and $O_2$ with a flow rate of 10 ml/minute.

Referring to FIG. 6, fuel cells comprising the triazole modified electrodes demonstrate improved properties over fuel cells comprising Nafion®-based electrodes. For instance, fuel cells comprising Nafion®-based electrodes have a peak power density of about 0.10 W/cm², whereas the peak power density of the fuel cells comprising triazole based electrodes is at least about 0.22 W/cm². In short, fuel cells comprising the electrodes of present invention demonstrate at least a 100% increase in peak power density over fuel cells comprising Nafion®-based electrodes.

Example 4

Preparation of Fuel Cell Electrode with Catalyst Layer Produced Via Phosphoric Acid Dopant 0.01 g 1,2,4-triazole-grafted polysiloxane, and TEOS and Si—C8 crosslinker (1:1 weight ratio) was dissolved in ml methanol/ethanol (1:1 weight ratio). Meanwhile, 0.2 g Pt/C (40% Pt, E-TEK) catalyst with a Pt loading was 1.0 mg/cm² was mixed with above-mentioned solution, followed by stirring for 2 hours and distribution in ultrasonic bath for half an hour. Thus, the catalyst ink was prepared. 5 g of the catalyst ink was cast on the gas diffusion layer (E-TEK, 100 cm²) directly. After the ink was dried carefully in air at room temperature overnight, the ink was heat-treated at 60° C. for 4 hours, and then 130° C. for half an hour in order to form the catalyst layer. After the catalyst layer was formed, the phosphoric acid in water solution was dropped on the surface electrode with acid loading of 20 mg/cm². The fuel cell electrode was thus prepared.

Example 5

Preparation of Fuel Cell Electrode with Catalyst Layer Produced Via Phosphoric Acid Catalyzing Reagent 0.01 g 1,2,4-triazole-grafted polysiloxane, and TEOS and Si—C8 crosslinker (1:1 weight ratio) was dissolved in 5 ml methanol/ethanol (1:1, weight ratio). Meanwhile, 0.2 g Pt/C (40% Pt, E-TEK) catalyst with a Pt loading was 1.5 mg/cm², 100 mg phosphate acid (equivalent to acid loading of 20 mg/cm²), were mixed with above-mentioned solution, followed by stiffing for 2 hours, and distribution in ultrasonic bath for half an hour. Thus, the catalyst ink was prepared. 5 g of the catalyst ink was cast on the gas diffusion layer (E-TEK, 100 cm²) directly. After the ink was dried carefully in air at room temperature overnight, the ink was heat-treated at 60° C. for 6 hours, and then 130° C. for 6 hour. The fuel cell electrode was thus prepared.

Example 6

Comparison of Phosphoric Acid Doped Electrodes (Example 4) with Phosphoric Acid Catalyzed Electrodes (Example 5)

Figure 10:
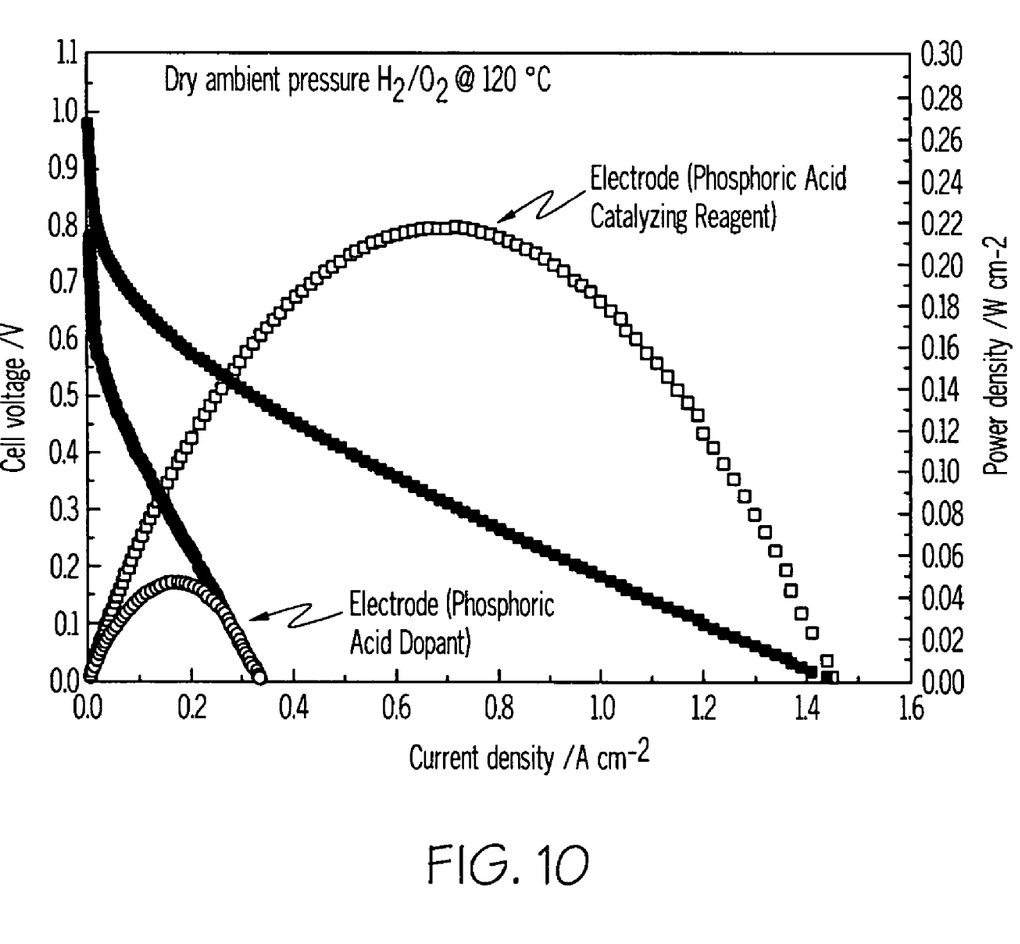
FIG. 10 is a graphical illustration comparing the MEA performance of an electrode having a phosphoric acid doped catalyst layer to an electrode having a phosphoric acid catalyzed catalyst layer according to one or more embodiments of the present invention.

To demonstrate the improved properties yielded when phosphoric acid is used as a catalyzing reagent prior to catalyst layer formation, the following experiments were conducted. Each electrode was incorporated into a fuel cell and was evaluated under the following conditions. The single cell torque was 4N·m. The single fuel cell was operated at 120° C. at ambient pressure of $H_2$ and $O_2$ with a flow rate of 10 ml/min. Referring to FIG. 10, the catalyzed phosphoric acid electrode achieved a peak power density of at least about 0.22

W/cm², which is significantly higher than the doped phosphoric acid electrode that achieved a peak power density of about 0.05 W/cm².

For the purposes of describing and defining the present invention it is noted that the terms "substantially" and "about" are utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of forming a fuel cell electrode comprising: providing a gas diffusion layer; forming a catalyst layer by reacting a mixture comprising at least one catalyst, about 5 mg/cm² to about 100 mg/cm² of phosphoric acid catalyzing reagent, a crosslinker, and a binder comprising at least one triazole modified polymer, wherein the triazole modified polymer comprises a polysiloxane backbone and a triazole substituent.

2. The method of claim 1 wherein the catalyst comprises platinum, platinum alloys, carbon, or combinations thereof.

3. The method of claim 1 wherein the triazole modified polymer is selected from the group consisting of 1,2,3-triazole grafted polysiloxane, 1,2,4-triazole grafted polysiloxane, and mixtures thereof.

4. The method of claim 1 wherein the fuel cell electrode achieves a peak power density of at least about 0.22 W/cm² at 120° C. and ambient pressure.

5. The method of claim 1 wherein the catalyst comprises platinum on a carbon based support.

6. The method of claim 1 wherein the phosphoric acid and the triazole modified polymer define a molar ratio of 3 moles of phosphoric acid per mole of triazole modified polymer.

7. The method of claim 1 wherein the catalyst layer defines a cellular microstructure.

8. The method of claim 1 wherein the crosslinker comprises tetraethyl orthosilicate.

9. The method of claim 1 wherein the crosslinker is an organosiloxane crosslinker.

10. The method of claim 1 wherein the catalyst layer is applied onto at least one surface of the gas diffusion layer in the form of an ink.

11. The method of claim 1 further comprising delivering the mixture to an ultrasonic bath.

* * * * *